United States Patent
Zheng et al.

(10) Patent No.: US 11,704,538 B2
(45) Date of Patent: Jul. 18, 2023

(54) DATA PROCESSING METHOD AND DEVICE

(71) Applicant: Baidu Online Network Technology (Beijing) Co., Ltd., Beijing (CN)

(72) Inventors: Huanxin Zheng, Beijing (CN); Guibin Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 572 days.

(21) Appl. No.: 16/691,130

(22) Filed: Nov. 21, 2019

(65) Prior Publication Data

US 2020/0387772 A1 Dec. 10, 2020

(30) Foreign Application Priority Data

Jun. 6, 2019 (CN) .......................... 201910492996.5

(51) Int. Cl.
*G06N 3/04* (2023.01)
*G06N 3/10* (2006.01)

(52) U.S. Cl.
CPC ................. *G06N 3/04* (2013.01); *G06N 3/10* (2013.01)

(58) Field of Classification Search
CPC ........ G06N 3/04; G06N 3/0445; G06N 3/063; G06N 3/08; G06N 3/10
See application file for complete search history.

(56) References Cited

U.S. PATENT DOCUMENTS

2016/0379111 A1* 12/2016 Bittner, Jr. ............... G06N 3/04
706/25

FOREIGN PATENT DOCUMENTS

| CN | 102629190 A | 8/2012 |
| CN | 107480782 A | 12/2017 |
| CN | 108154228 A | 6/2018 |

OTHER PUBLICATIONS

Rhu et al. ("vDNN: Virtualized Deep Neural Networks for Scalable, Memory-Efficient Neural Network Design", 2016 49th Annual IEEE?ACM International Symposium on Microarchitecture (MICRO), 2016, pp. 1-13 ) (Year: 2016).*
Wang et al. ("Accelerating Recurrent Neural Networks: A Memory-Efficient Approach", IEEE Transactions On Very Large Scale Integration (VLSI) Systems, vol. 25, No. 10, Oct. 2017, pp. 2763-2775) (Year: 2017).*
Diamos et al. ("Persistent RNNs: Stashing Recurrent Weights On-Chip", Proceedings of the 33rd International Conference on Machine Learning, vol. 48, 2016. pp. 1-10) (Year: 2016).*

(Continued)

*Primary Examiner* — Miranda M Huang
*Assistant Examiner* — Robert Lewis Kulp
(74) *Attorney, Agent, or Firm* — Banner & Witcoff, Ltd.

(57) ABSTRACT

A data processing method and device are provided. The method includes: performing a forward calculation of a neural network on global data to obtain intermediate data for a reverse calculation of the neural network; storing the intermediate data in a buffer unit; reading the intermediate data from the buffer unit; and performing the reverse calculation of the neural network on the intermediate data to obtain a result of the reverse calculation. According to embodiments, in the reverse calculation of the neural network, the number of accessing the global memory is reduced, thereby reducing the computational time cost and increasing the data processing speed.

9 Claims, 11 Drawing Sheets

(56) References Cited

OTHER PUBLICATIONS

Li et al. ("E-RNN Design Optimization for Efficient Recurrent Neural Networks in FPGAs", https://arxiv.org/pdf/1812.07106.pdf, arXiv:1812.07106v1 [cs.CV] Dec. 12, 2018, pp. 1-12) (Year: 2018).*
Gruslys et al. ("Memory-Efficient Backpropagation Through Time", Advances in Neural Information Processing Systems 29, 2016, pp. 1-9) (Year: 2016).*
Office Action issued by CNIPA in connection with CN Application No. 201910492996.5 dated Jun. 4, 2020.
Search Report issued by CNIPA in connection with CN Application No. 201910492996.5 dated May 28, 2020.

* cited by examiner

DATA PROCESSING METHOD AND DEVICE

CROSS-REFERENCE TO RELATED APPLICATION

This application claims priority to Chinese Patent Application No. 201910492996.5, filed on Jun. 6, 2019, which is hereby incorporated by reference in its entirety.

TECHNICAL FIELD

The present application relates to a field of data processing technology, and in particular, to a data processing method and device.

BACKGROUNDS

Artificial Neural Network (ANN) is a research hotspot in the field of artificial intelligence since the 1980s. The ANN abstracts the human brain neuron network from the perspective of information processing to establish a simple model and form different networks according to different connection methods. In engineering and academia, the ANN is often referred directly as a neural network or a neuro-like network. A neural network is an operational model consisting of a large number of nodes (or neurons) connected to each other. Each node represents a specific output function called as an activation function. A connection between every two nodes represents a weighting value of a signal passing the connection, called as a weight, which is equivalent to a memory of the ANN. An output of the network varies depending on the connection method of the network, weighting values and activation functions. The network itself is usually an approximation of an algorithm or a function in nature, or it may be an expression of a logic strategy.

Research work of the ANN is being deepened constantly and a great progress has been made in the past decade. For example, many practical problems that are difficult to be solved by modem computers have been successfully solved in the fields of pattern recognition, intelligent robotics, automatic control, predictive estimation, biology, medicine, economy, etc., and good intelligent characteristics have been exhibited. Mass data processing is involved in the neural network, such as a forward propagation calculation (forward calculation) and a reverse propagation calculation (reverse calculation). Reducing the data processing time and increasing the data processing speed are very important for improvement of performance of the neural network.

SUMMARY

A data processing method, device, apparatus and a computer-readable storage medium are provided according to embodiments of the present application, so as to at least solve the above technical problems in the existing technology.

In a first aspect, a data processing method includes:
performing a forward calculation of a neural network on global data to obtain intermediate data for a reverse calculation of the neural network;
storing the intermediate data in a buffer unit;
reading the intermediate data from the buffer unit: and
performing the reverse calculation of the neural network on the intermediate data to obtain a result of the reverse calculation.

In one implementation, the method further includes:
storing the result of the reverse calculation in a global memory unit.

In one implementation, the neural network is a recurrent neural network (RAN), and the global data includes:
output data of a previous forward calculation, a weight of the output data of the previous forward calculation, input data of the forward calculation, and a weight of the input data of the forward calculation.

In one implementation, before the performing a forward calculation of a neural network on global data to obtain intermediate data for a reverse calculation of the neural network, the method further includes:
performing the forward calculation of the neural network on the global data to obtain output data of the forward calculation; and
storing the output data of the forward calculation in a global memory unit.

In one implementation, the buffer unit is a register or a cache.

In a second aspect, a data processing device includes:
a forward recalculation module, configured to perform a forward calculation of a neural network on global data to obtain intermediate data for a reverse calculation of the neural network;
an intermediate data storing module, configured to store the intermediate data in a buffer unit;
an intermediate data reading module, configured to read the intermediate data from the buffer unit; and
a reverse calculation module, configured to perform the reverse calculation of the neural network on the intermediate data to obtain a result of the reverse calculation.

In one implementation, the device further includes:
a reverse calculation result storing module, configured to store the result of the reverse calculation in a global memory unit.

In one implementation, the neural network is a recurrent neural network (RAN), and the global data includes:
output data of a previous forward calculation, a weight of the output data of the previous forward calculation, input data of the forward calculation, and a weight of the input data of the forward calculation.

In one implementation, the device further includes:
a forward calculation module, configured to perform the forward calculation of the neural network on the global data to obtain output data of the forward calculation; and
a forward calculation result storing module, configured to store the output data of the forward calculation in a global memory unit.

In one implementation, the buffer unit is a register or a cache.

In a third aspect, a data processing apparatus is provided according to an embodiment of the present application. The functions of the apparatus may be implemented by hardware, or by hardware executing corresponding software. The hardware or software includes one or more modules corresponding to the above functions.

In a possible implementation, the data processing apparatus includes a processor and a storage, the storage is configured to store a program for supporting the above data processing method executed by the data processing apparatus, the processor is configured to execute the program stored in the storage. The data processing apparatus further includes a communication interface configured for communication between the data processing apparatus and another apparatus or communication network.

In a fourth aspect, a computer-readable storage medium is provided for storing computer software instructions used by the data processing apparatus, the computer software instructions include programs involved in execution of the above data processing method.

One of the above technical solutions has the following advantages or beneficial effects: in an embodiment of the present application, in a reverse calculation, firstly, a forward calculation is performed on the obtained global data, and then the reverse calculation is performed on intermediate data obtained by performing the forward calculation. That is, a forward calculation is performed on data by using a forward propagation algorithm in the forward calculation, and the forward calculation is performed on the data again in a reverse calculation. Although the number of calculations is increased, the intermediate data are not required to be stored in a global memory in the forward calculation. Since the amount of the global data is smaller than the amount of the intermediate data of the forward calculation, the number of reading the global memory can be reduced in the reverse calculation, thereby reducing the computational time cost and increasing the data processing speed.

Another of the above technical solutions has the following advantages or beneficial effects: in an embodiment of the present application, in a forward calculation, only output data of the forward calculation are required to be stored in the global memory, and the intermediate data are not required to be stored in the global memory, thereby reducing the number of accessing the global memory, improving the data processing speed, and saving the global memory space. When the amount of intermediate data of the forward calculation is large, it is not necessary to prepare a large memory space to store the intermediate data, and the structure of the neural network is also optimized.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed according to the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
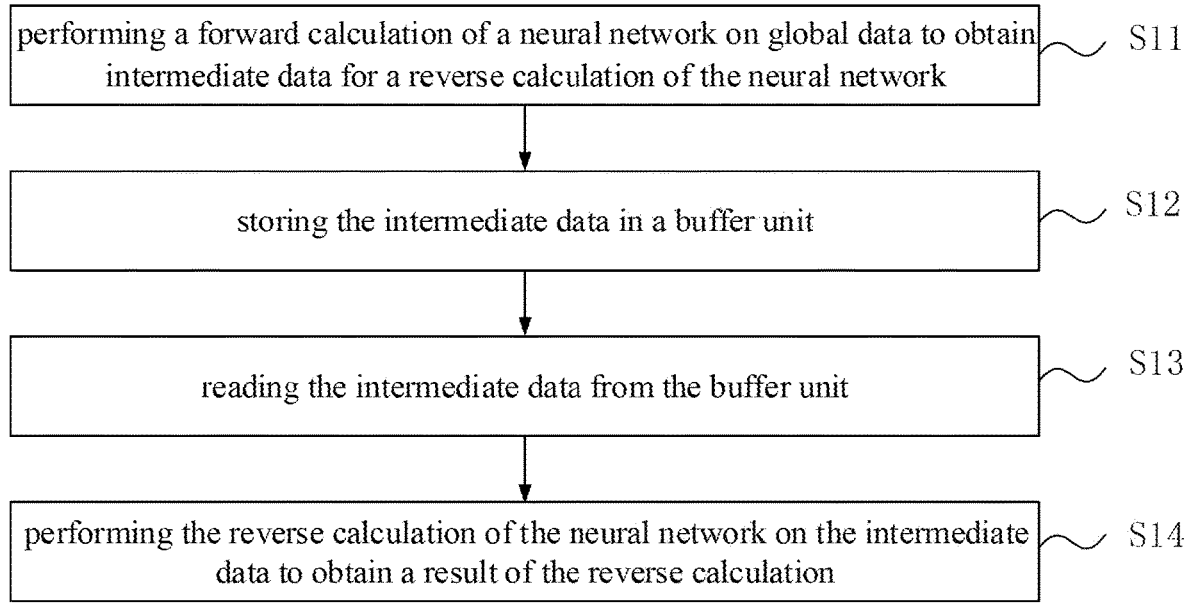
FIG. 1 shows a flowchart of a data processing method according to an embodiment of the present application.

FIG. 1 shows a flowchart of a data processing method according to an embodiment of the present application. As shown in FIG. 1, the data processing method includes:

S11, performing a forward calculation of a neural network on global data to obtain intermediate data for a reverse calculation of the neural network;

S12, storing the intermediate data in a buffer unit;

S13, reading the intermediate data from the buffer unit; and

S14, performing the reverse calculation of the neural network on the intermediate data to obtain a result of the reverse calculation.

The neural network includes a multi-layer architecture, and data processing in each layer includes a forward calculation and a reverse calculation. Generally, the neural network performs the forward calculation firstly and then performs the reverse calculation. The reverse calculation relies on the intermediate data of the forward calculation. After the forward calculation, the result of the forward calculation is stored in a global memory. The result of the forward calculation includes output data and intermediate data of the forward calculation. During the reverse calculation, the intermediate data required for the reverse calculation and the output data of the forward calculation are read from the global memory to perform directly the reverse calculation. An operation to read from or write to the global memory takes hundreds of clock cycles, and the forward calculation only requires single-digit clock cycle(s). However, computational cost saved cannot offset cost caused by accessing the global memory.

In the embodiment of the present application, in a reverse calculation, firstly, a forward calculation is performed on the obtained global data, and then the reverse calculation is performed on intermediate data obtained by performing the forward calculation. That is, a forward calculation is performed on data by using a forward propagation algorithm in the forward calculation, and the forward calculation is performed on the data again in a reverse calculation. Although the number of calculations is increased, the intermediate data are not required to be stored in a global memory in the forward calculation. Since the amount of the global data is smaller than the amount of the intermediate data of the forward calculation, the number of reading the global memory can be reduced in the reverse calculation, thereby reducing the computational time cost and increasing the data processing speed.

Figure 2:
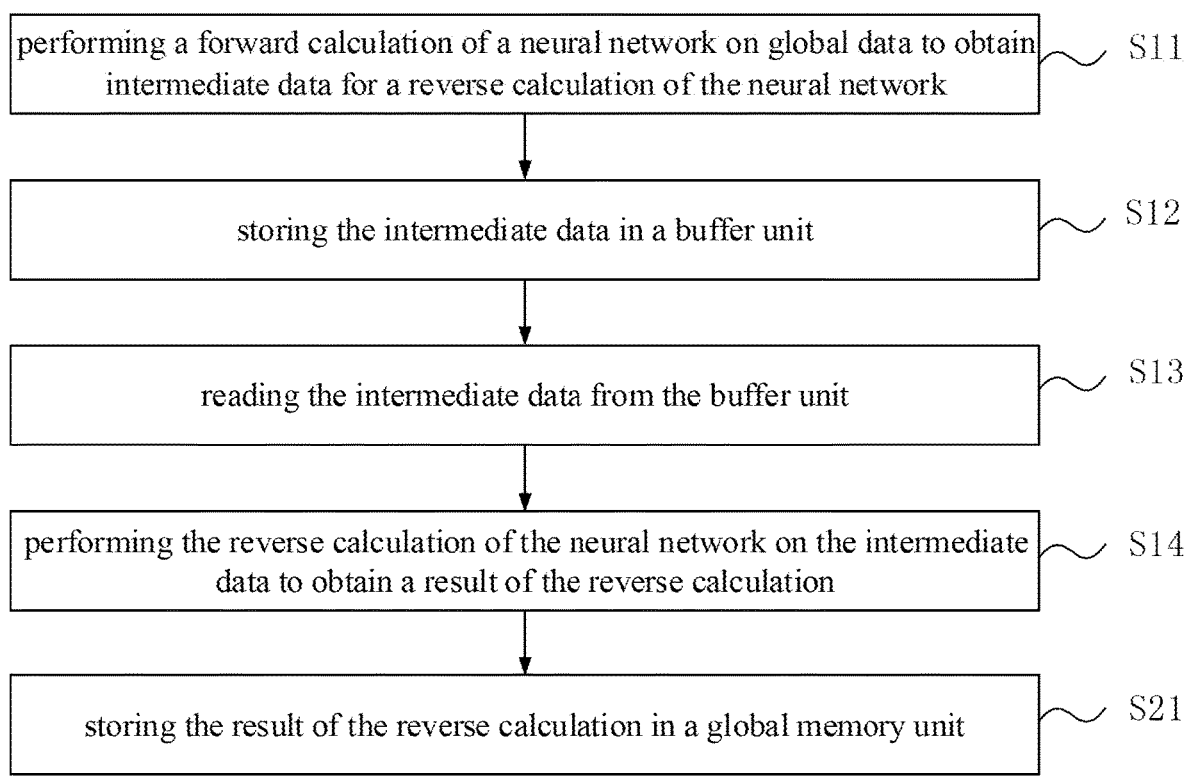
FIG. 2 shows a flowchart of a data processing method according to an embodiment of the present application.

FIG. 2 shows a flowchart of a data processing method according to an embodiment of the present application. In this embodiment, S11 to S14 refer to the corresponding description in the above embodiment, and description thereof is omitted herein.

As shown in FIG. 2, a difference between this embodiment and the above embodiment is that the data processing method further includes:

S21, storing the result of the reverse calculation in a global memory unit.

In the embodiment of the present application, in hardware architecture of the NVIDIA Graphics Processing Unit (GPU), a delay of accessing a shared display memory and a register on a chip, and a delay of a computation instruction are all about 100 times smaller than that of accessing a global display memory. Therefore, the number of accessing a global memory may be reduced by repetitive calculations. The data processing speed can be significantly increased by reducing storage of the intermediate data.

In one embodiment, the neural network is a recurrent neural network (RNN), and the global data includes: output data of a previous forward calculation, a weight of the output data of the previous forward calculation, input data of a current forward calculation, and a weight of the input data of the current forward calculation.

Assuming that following formulas can be used in a forward calculation in the RNN. Where $w_1$, $w_2$ represent weights of the neural network, at represents an input, $f_t$ represents an output, $x_t$, $y_t$, $z_t$ are intermediate results, and t is at a time t. The corresponding formulas of the forward calculation are as follows:

$$x_t = a_t w_1 + f_{t-1} w_2, \quad \text{Formula 1}$$

$$y_t = x_t f_{t-1}, \quad \text{Formula 2}$$

$$z_t = x_t y_t, \quad \text{Formula 3}$$

$$f_t = y_t z_t, \quad \text{Formula 4}$$

Assuming that a cost function is L, the following formulas of the reverse calculation can be derived from the formulas of the forward calculation by using a chain method:

$$\frac{\partial L}{\partial f_t} = \frac{\partial L}{\partial y_{t+1}} x_{t+1} + \frac{\partial L}{\partial x_{t+1}} w_2, \quad \text{Formula 5}$$

$$\frac{\partial L}{\partial z_t} = \frac{\partial L}{\partial f_t} y_t, \quad \text{Formula 6}$$

$$\frac{\partial L}{\partial y_t} = \frac{\partial L}{\partial z_t} x_t + \frac{\partial L}{\partial f_t} z_t, \quad \text{Formula 7}$$

$$\frac{\partial L}{\partial x_t} = \frac{\partial L}{\partial y_t} f_{t-1} + \frac{\partial L}{\partial z_t} y_t, \quad \text{Formula 8}$$

With respect to RNN, the following methods are generally used.

The formulas 1 to 4 are calculated for a forward process as below. The intermediate results $x_t$, $y_t$, $z_t$ are stored in the global memory for a reverse process.

According to stored intermediate variables, the intermediate results corresponding to the reverse process can be reused as follows:

TABLE 1

|           | $x_t$  | $y_t$  | $z_t$  | $f_t$  |
|-----------|--------|--------|--------|--------|
| Formula 5 | reused |        |        |        |
| Formula 6 |        | reused |        |        |
| Formula 7 | reused |        | reused |        |
| Formula 8 |        | reused |        | reused |

Through the method according to the embodiment of the present application, in the forward calculation, the intermediate results are not required to be saved, that is, in the forward process, saving several intermediate results $x_t$, $y_t$, $z_t$ is omitted. The formulas 1 to 4 are recalculated for the reverse process. Since the reverse process is implemented on a kernel function, the intermediate results are stored in a register for subsequent calculations, register reading takes only one clock cycle, and a calculation instruction only requires single-digit clock cycle(s), cost of the recalculation can be can be ignored. Therefore, a performance difference may be analyzed by comparing the global memory access before and after optimization.

The comparison of the global memory access in the forward process is as follows. R represents reading, W represents writing. "Before optimization" represents a normal method is used, and "After optimization" represents the method according to the embodiment of the present application is used.

TABLE 2

|                     | $a_t$ | $w_1$ | $w_2$ | $f_{t-1}$ | $x_t$ | $y_t$ | $z_t$ | $f_t$ |
|---------------------|-------|-------|-------|-----------|-------|-------|-------|-------|
| Before optimization | R     | R     | R     | R         | W     | W     | W     | W     |
| After optimization  | R     | R     | R     | R         |       |       |       | W     |

The comparison of the global memory access in the reverse process is as follows:

TABLE 3

|                     | $a_t$ | $w_1$ | $w_2$ | $f_{t-1}$ | $x_t$ | $y_t$ | $z_t$ | $f_t$ |
|---------------------|-------|-------|-------|-----------|-------|-------|-------|-------|
| Before optimization |       |       |       | R         | R     | R     | R     | R     |
| After optimization  | R     | R     | R     | R         |       |       |       |       |

According to Table 2 and Table 3, the total number of accessing the global memory before the optimization is 13 times, and it becomes 9 times after the optimization. It can be roughly estimated that the speed performance is improved by 44%, and none of the intermediate results $x_t$, $y_t$, $z_t$ is required to be saved, thereby saving cost of the global display memory.

In the embodiment of the present application, the data processing method is applicable to the common RNN and variants thereof, such as Long Short-Term Memory (LSTM), LSTM Projection Layer (LSTMP), Graphics Processing Unit (GPU), Simple Recurrent Units (SRU), wave RNN (WaveRNN), and the like. The method has strong generalization.

Figure 3:
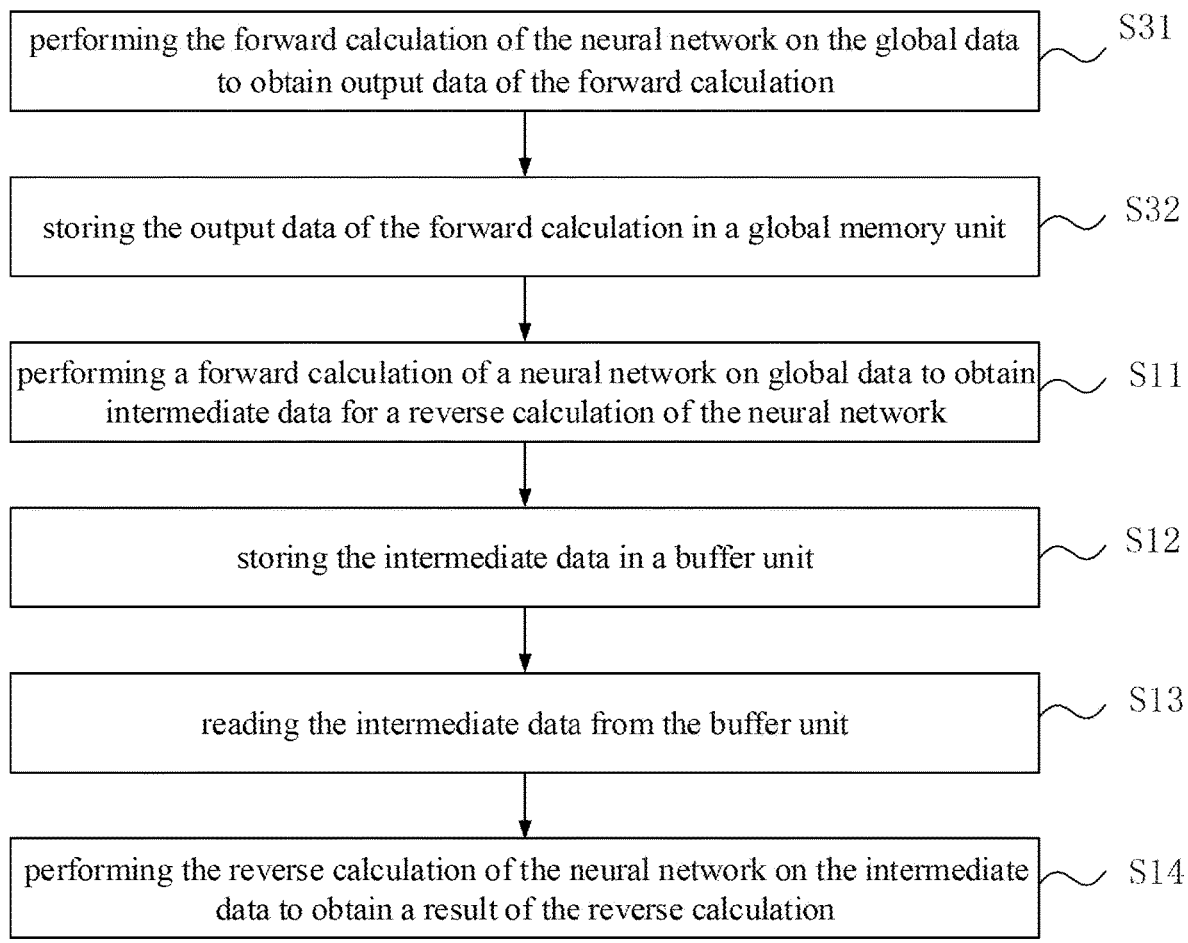
FIG. 3 shows a flowchart of a data processing method according to an embodiment of the present application.

FIG. 3 shows a flowchart of a data processing method according to an embodiment of the present application. In this embodiment, S11 to S14 refer to the corresponding description in the above embodiment, and description thereof is omitted herein.

As shown in FIG. 3, a difference between this embodiment and the above embodiment, before the performing a forward calculation of a neural network on global data to obtain intermediate data for a reverse calculation of the neural network, the method further includes:

S31, performing the forward calculation of the neural network on the global data to obtain output data of the forward calculation; and S32, storing the output data of the forward calculation in a global memory unit.

For example, S31 may refer to the above formulas 1 to 4, and the output data of the forward calculation includes $f_t$.

In the embodiment of the present application, in a forward calculation, only output data of the forward calculation are required to be stored in the global memory, and the intermediate data are not required to be stored in the global memory, thereby reducing the number of accessing the global memory, improving the data processing speed, and saving the global memory space. When the amount of intermediate data of the forward calculation is large, it is not necessary to prepare a large memory space to store the intermediate data, and the structure of the neural network is also optimized.

In one embodiment, the buffer unit is a register or a cache.

Figure 4:
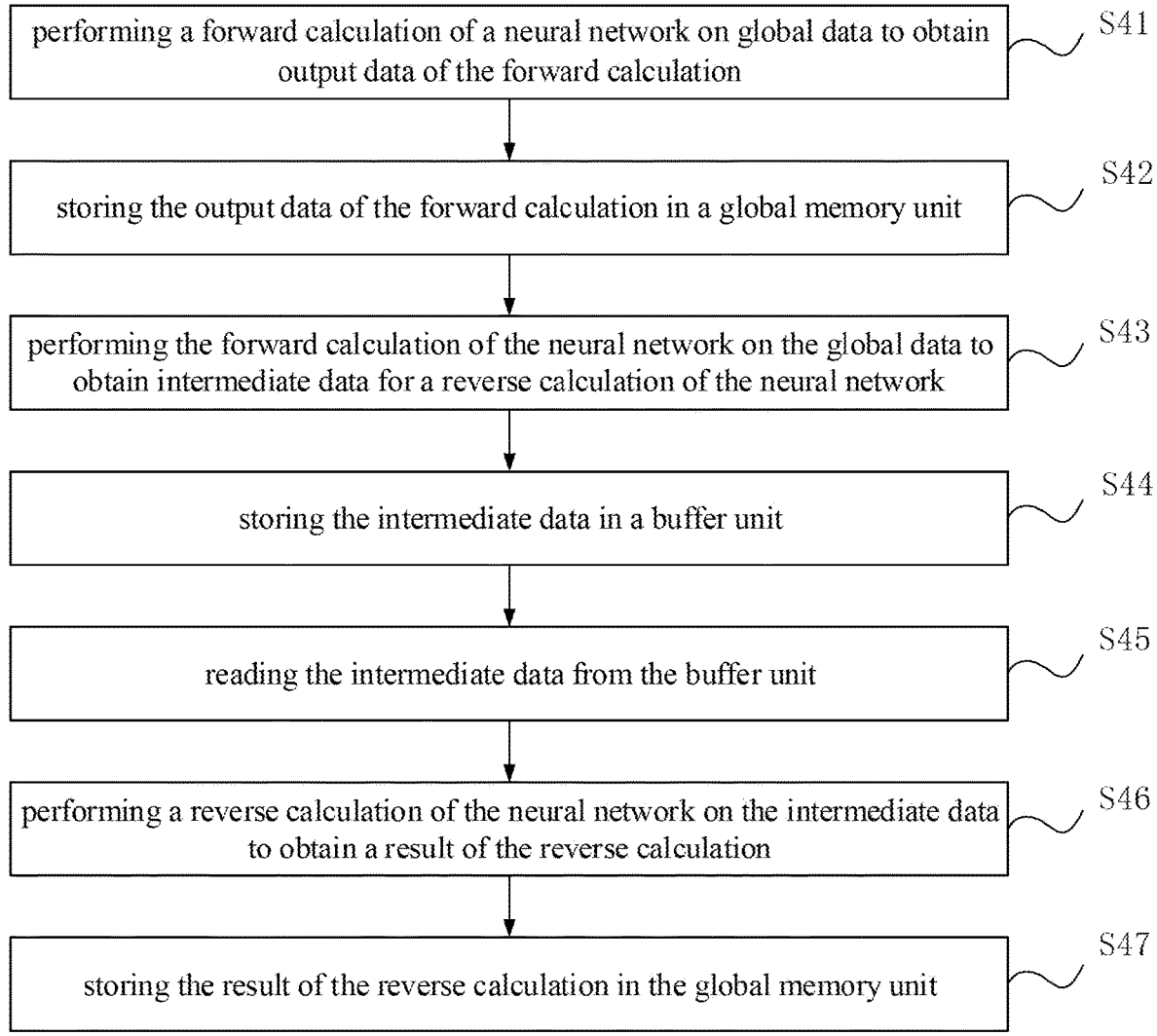
FIG. 4 shows a flowchart of a data processing method according to an embodiment of the present application.

In the process of a reverse calculation, when performing a forward calculation, only the intermediate data are calculated, and the output data are not required to be calculated. In an example of the present application, as shown in FIG. 4, the data processing method includes:

S41, performing a forward calculation of a neural network on global data to obtain output data of the forward calculation, such as $f_t$ in formulas 1 to 4;

S42, storing the output data of the forward calculation in a global memory unit;

S43, performing the forward calculation of the neural network on the global data to obtain intermediate data for a reverse calculation of the neural network;

S44, storing the intermediate data in a buffer unit;

S45, reading the intermediate data from the buffer unit;

S46, performing a reverse calculation of the neural network on the intermediate data to obtain a result of the reverse calculation; and S47, storing the result of the reverse calculation in the global memory unit.

Figure 5:
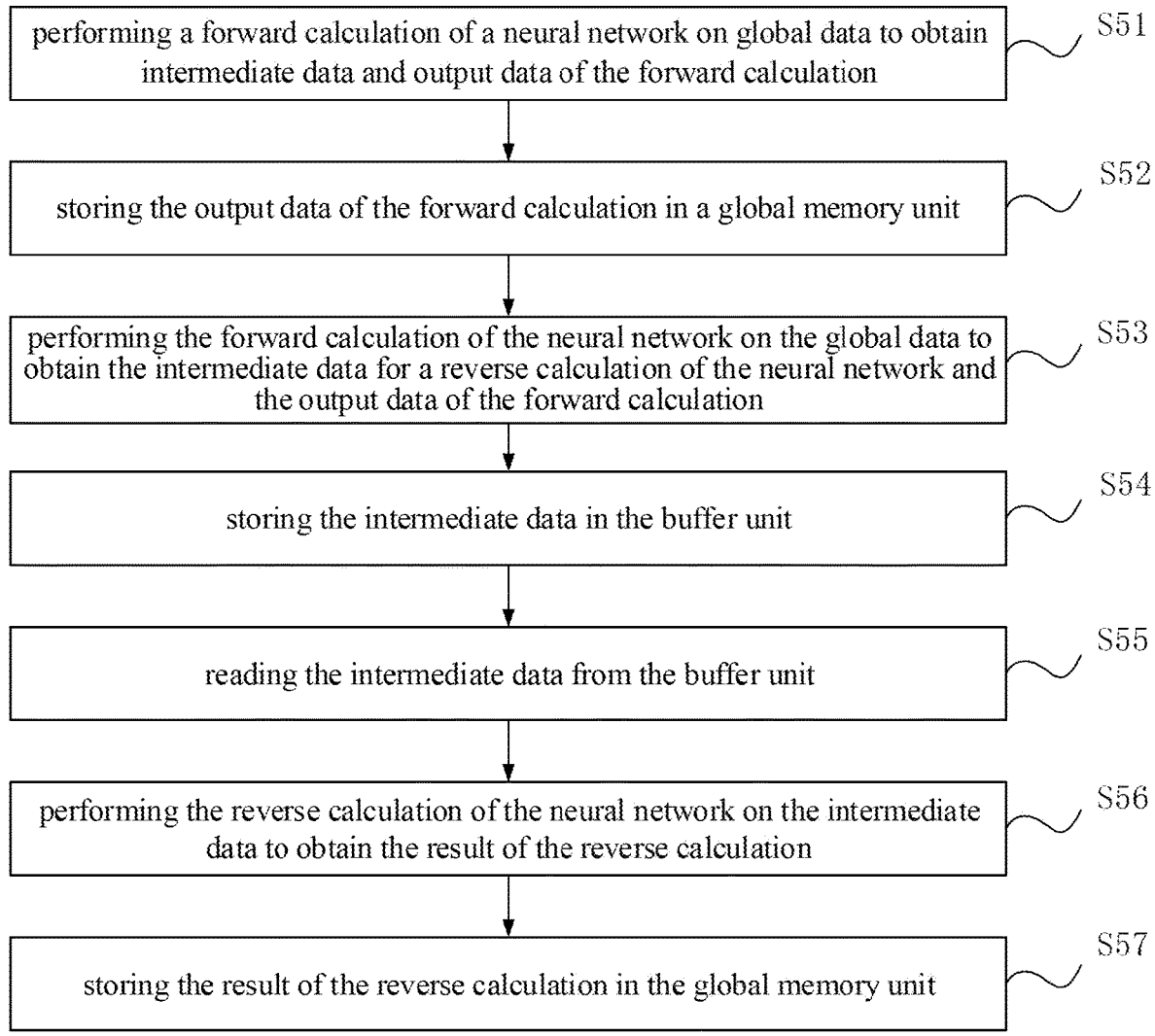
FIG. 5 shows a flowchart of a data processing method according to an embodiment of the present application.

In the process of a reverse calculation, when performing a forward calculation, it is possible to calculate both the intermediate data and the output data. In another example of the present application, as shown in FIG. 5, the data processing method includes:

S51, performing a forward calculation of a neural network on global data to obtain intermediate data and output data of the forward calculation;

S52, storing the output data of the forward calculation in a global memory unit;

S53, performing the forward calculation of the neural network on the global data to obtain the intermediate data for a reverse calculation of the neural network and the output data of the forward calculation;

S54, storing the intermediate data in the buffer unit;

S55, reading the intermediate data from the buffer unit;

S56, performing the reverse calculation of the neural network on the intermediate data to obtain the result of the reverse calculation; and S57, storing the result of the reverse calculation in the global memory unit.

For example, the output data may be $f_t$ in the formulas 1 to 4, and the intermediate data may be $x_t$, $y_t$, $z_t$ in the formulas 1 to 4.

Figure 6:
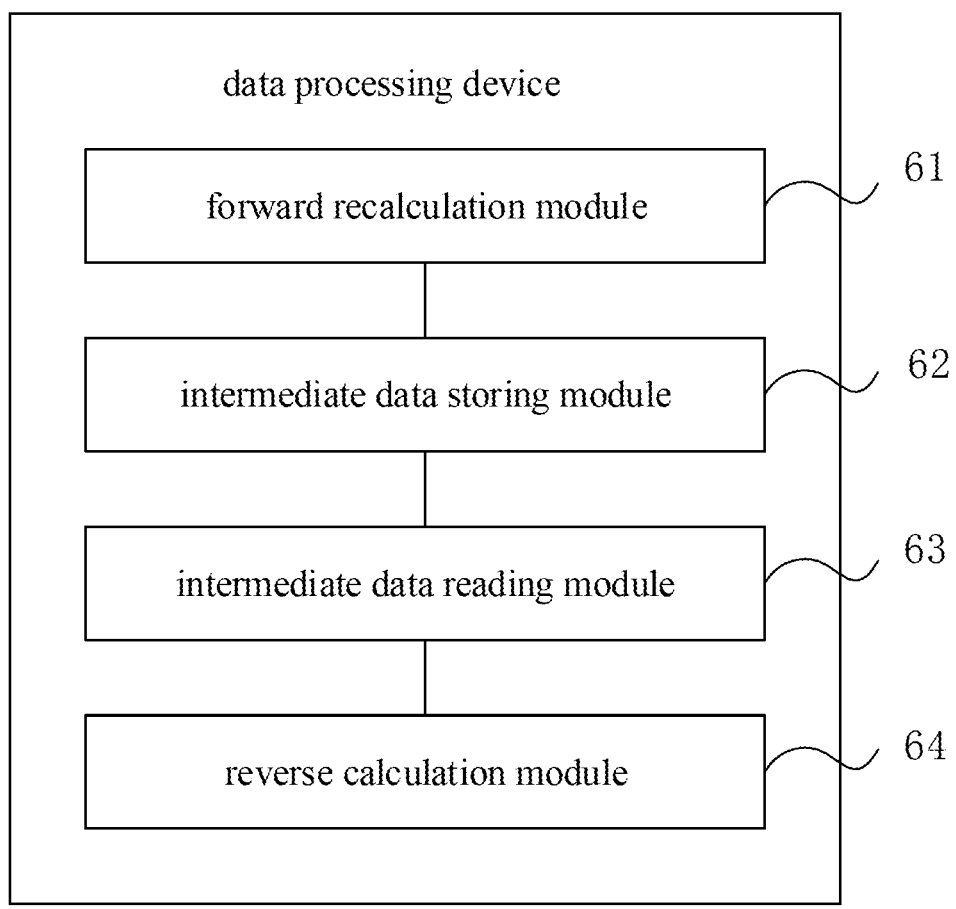
FIG. 6 shows a structural block diagram of a data processing device according to an embodiment of the present application.

A data processing device is provided according to an embodiment of the application, as shown in FIG. 6, the device includes:

a forward recalculation module 61, configured to perform a forward calculation of a neural network on global data to obtain intermediate data for a reverse calculation of the neural network;

an intermediate data storing module 62, configured to store the intermediate data in a buffer unit;

an intermediate data reading module 63, configured to read the intermediate data from the buffer unit; and a reverse calculation module 64, configured to perform the reverse calculation of the neural network on the intermediate data to obtain a result of the reverse calculation.

Figure 7:
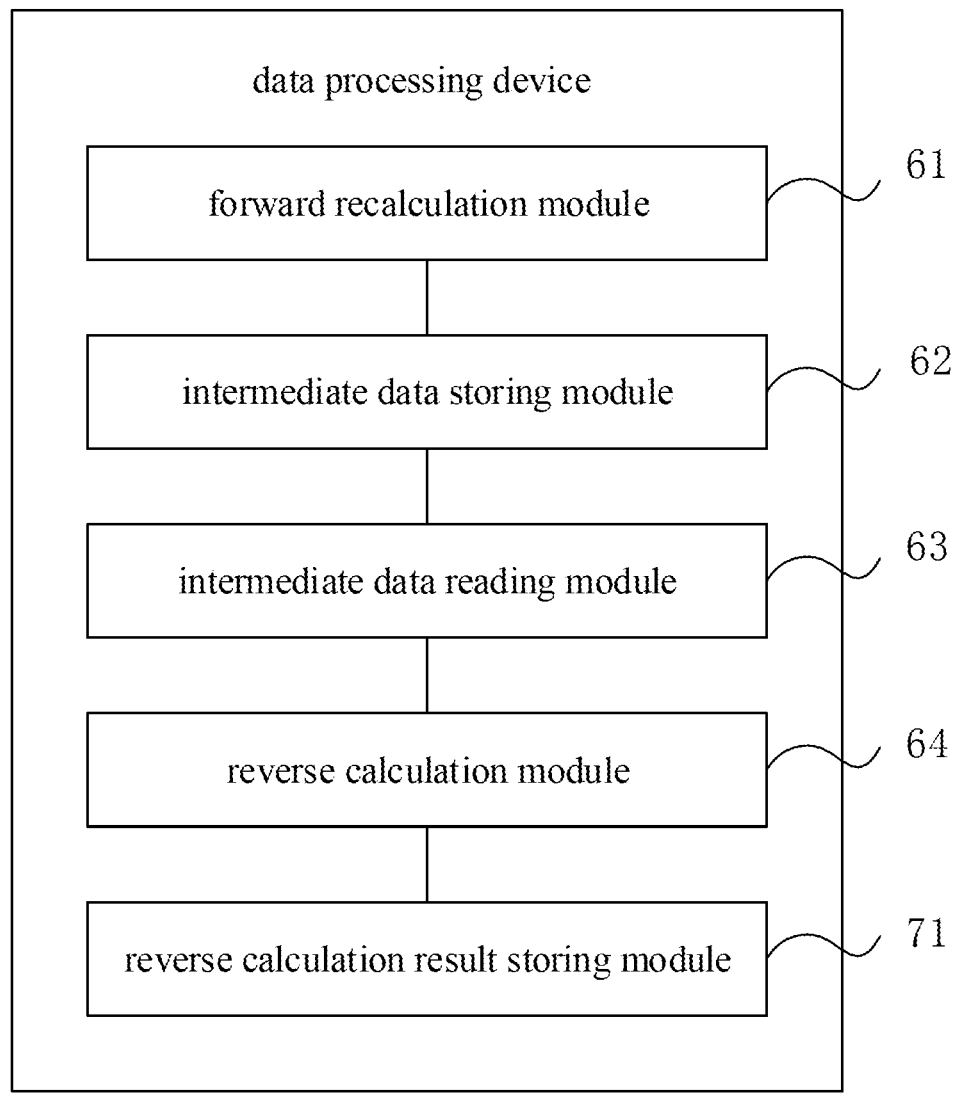
FIG. 7 shows a structural block diagram of a data processing device according to an embodiment of the present application.

FIG. 7 shows a structural block diagram of a data processing device according to an embodiment of the present application. The forward recalculation module 61, the intermediate data storing module 62, the intermediate data reading module 63, and the reverse calculation module 64 in the embodiment refer to the corresponding description in the above embodiment, and description thereof is omitted herein.

As shown in FIG. 7, a difference between this embodiment and the above embodiment is that the data processing device further includes:

a reverse calculation result storing module 71, configured to store the result of the reverse calculation in a global memory unit.

In one implementation, the neural network is a recurrent neural network (RNN), and the global data includes:

output data of a previous forward calculation, a weight of the output data of the previous forward calculation, input data of a current forward calculation, and a weight of the input data of the current forward calculation.

Figure 8:
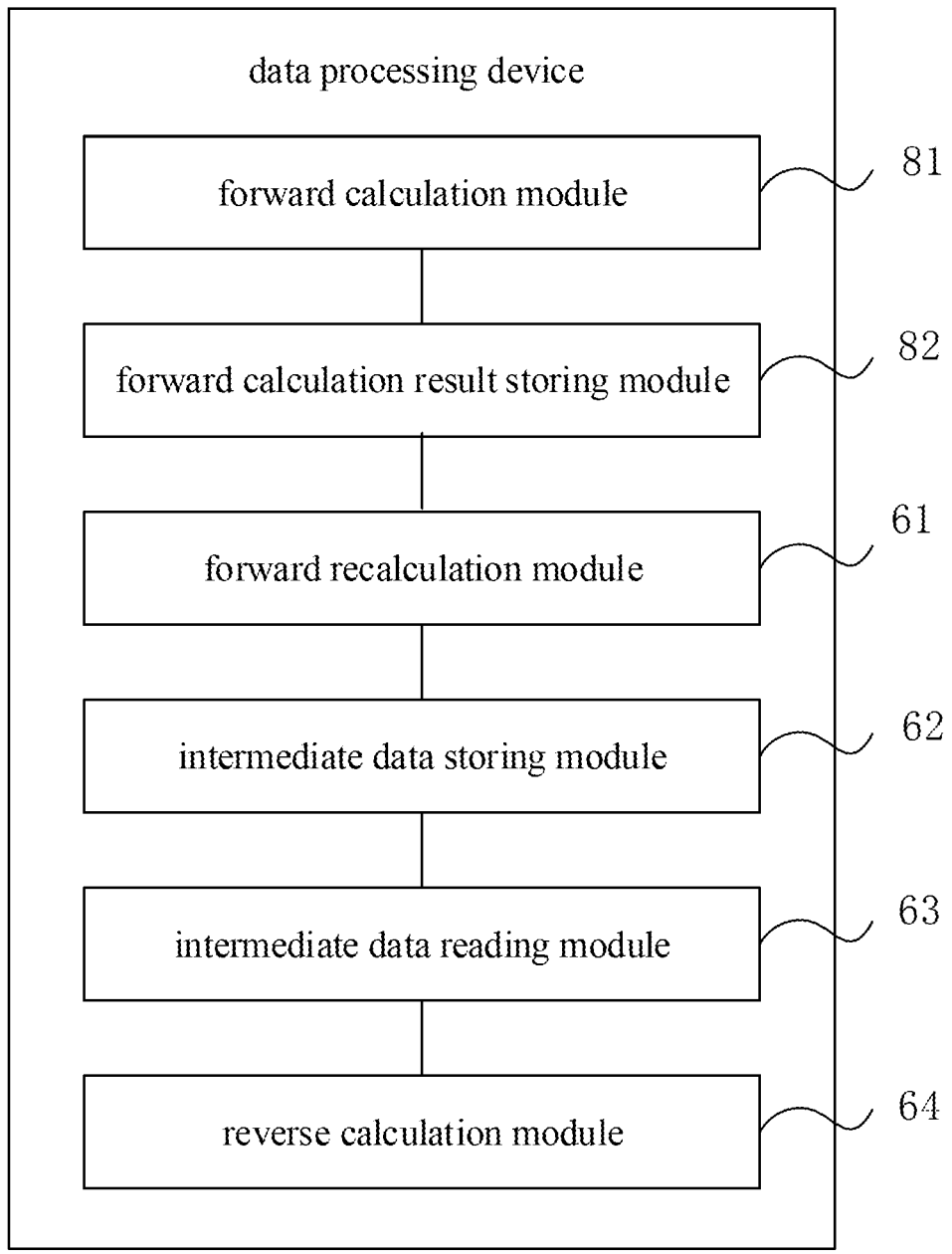
FIG. 8 shows a structural block diagram of a data processing device according to an embodiment of the present application.

FIG. 8 shows a structural block diagram of a data processing device according to an embodiment of the present application. The forward recalculation module 61, the intermediate data storing module 62, the intermediate data reading module 63, and the reverse calculation module 64 in the embodiment refer to the corresponding description in the above embodiment, and description thereof is omitted herein.

As shown in FIG. 8, a difference between this embodiment and the above embodiment is that the data processing device further includes:

a forward calculation module 81, configured to perform the forward calculation of the neural network on the global data to obtain output data of the forward calculation; and a forward calculation result storing module 82, configured to store the output data of the forward calculation in a global memory unit.

In one implementation, the buffer unit is a register or a cache.

In this embodiment, functions of modules in the device refer to the corresponding description of the above mentioned method and thus the description thereof is omitted herein.

Figure 9A:
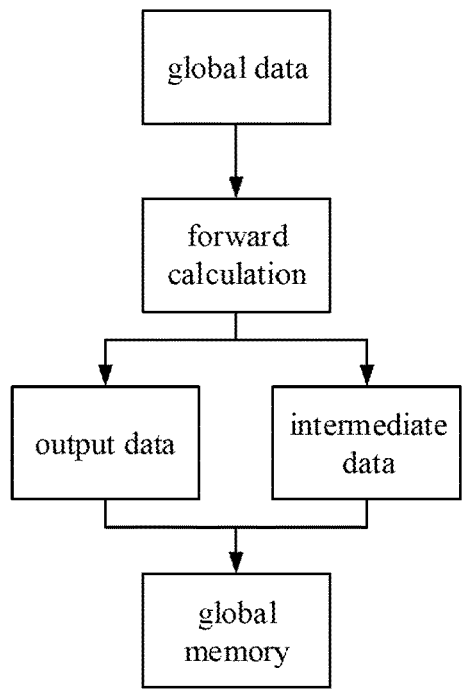
FIG. 9A, FIG. 9B, FIG. 9C, and FIG. 9D show schematic diagrams of data reading and writing before and after optimization using a data processing method according to an embodiment of the present application.
Figure 9B:
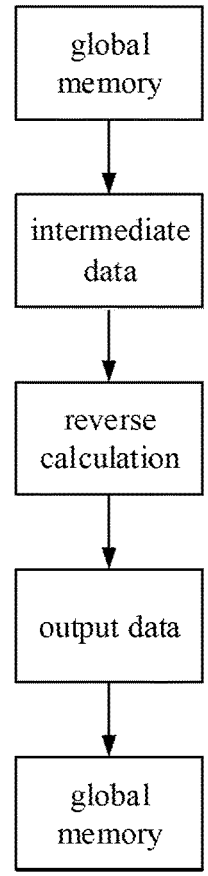
Figure 9C:
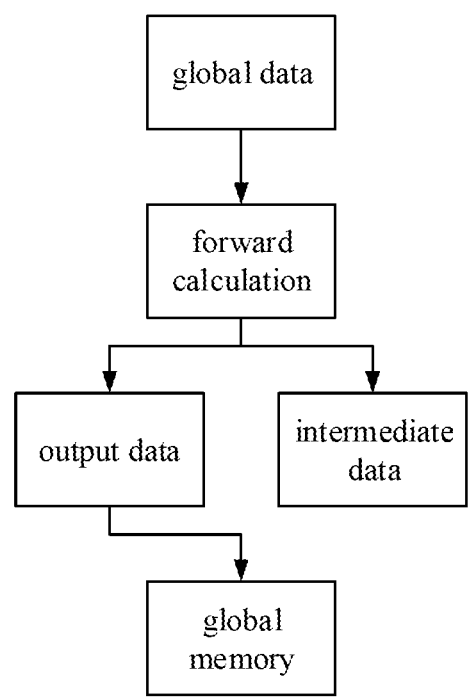
Figure 9D:
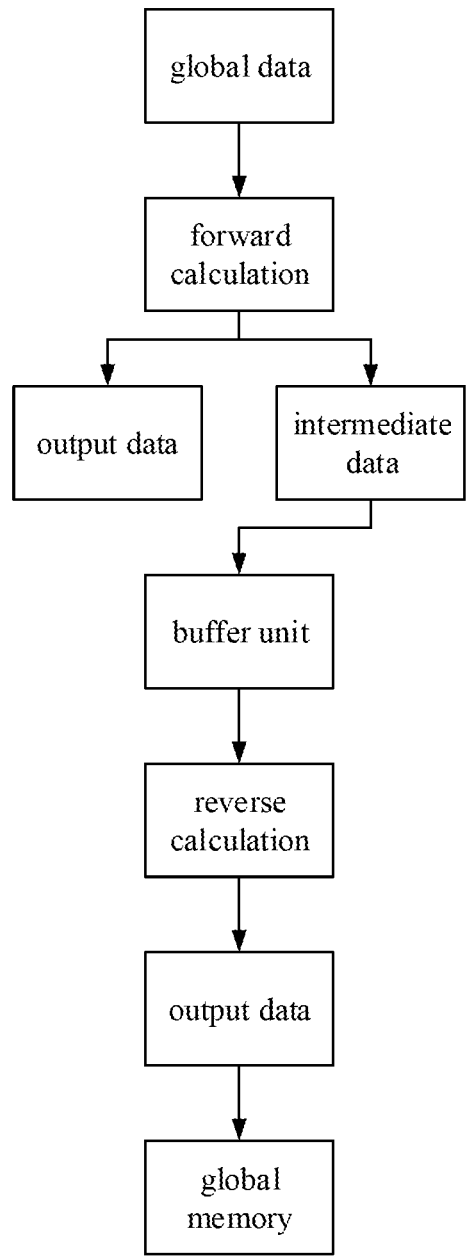

FIG. 9A, FIG. 9B, FIG. 9C, and FIG. 9D show schematic diagrams of data reading and writing before and after optimization using a data processing method according to an embodiment of the present application. FIG. 9A is a schematic diagram of data reading and writing and processing of a forward calculation before optimization. FIG. 9B is a schematic diagram of data reading and writing and processing of a reverse calculation before optimization. FIG. 9C is a schematic diagram of data reading and writing and processing of a forward calculation after optimization. FIG. 9D is a schematic diagram of data reading and writing and processing of a reverse calculation after optimization. By using the data processing method according to the embodiment of the application, in the reverse calculation, only the global data are read from the global memory without reading the intermediate data from the global memory. The amount of the global data is smaller than the amount of the intermediate data. In the forward calculation, only the output data are stored in the global memory without storing the intermediate data in the global memory. Therefore, the number of accessing the global memory can be reduced, thereby improving the data processing speed.

Figure 10:
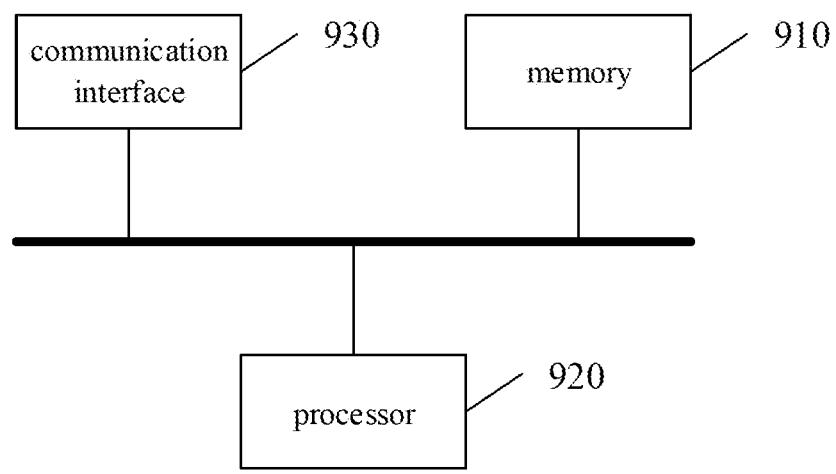
FIG. 10 shows a structural block diagram of a data processing apparatus according to an embodiment of the present application.

FIG. 10 shows a structural block diagram of a data processing apparatus according to an embodiment of the present application. As shown in FIG. 10, the apparatus includes: a memory 910 and a processor 920. When the processor 920 executes the computer program, the data processing method in the foregoing embodiment is implemented. The number of the memory 910 and the processor 920 may be one or more.

The apparatus further includes:

a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component Interconnect (PCI) bus, an Extended Industry Standard Component (EISA) bus, or the like. The bus may be divided into an address bus, a data bus, a control bus, and the like. For ease of illustration, only one bold line is shown in FIG. 10, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer software instructions, which include programs involved in execution of the above data processing method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A data processing method, implemented by circuits for implementing functions, comprising:
    performing, by the circuits for implementing functions, a forward calculation of a neural network on global data to obtain output data of the forward calculation;
    storing, by the circuits for implementing functions, the output data of the forward calculation in a global memory unit, wherein intermediate data is not stored in the global memory unit;
    performing, by the circuits for implementing functions, the forward calculation of the neural network on the global data again, to obtain the intermediate data for a reverse calculation of the neural network;
    storing, by the circuits for implementing functions, the intermediate data in a buffer unit;
    reading, by the circuits for implementing functions, the intermediate data from the buffer unit; and
    performing, by the circuits for implementing functions, the reverse calculation of the neural network on the intermediate data to obtain a result of the reverse calculation,
    wherein the neural network is a recurrent neural network (RNN):
    following formulas are used in the forward calculation in the RNN:

$x_t = a_t w_1 + f_{t-1} w_2;$ $y_t = x_t f_{t-1};$ $z_t = x_t y_t;$ $f_t = y_t z_t;$ following formulas are used in the reverse calculation in the RNN:

$\frac{\partial L}{\partial f_t} = \frac{\partial L}{\partial y_{t+1}} x_{t+1} + \frac{\partial L}{\partial x_{t+1}} w_2;$ $\frac{\partial L}{\partial z_t} = \frac{\partial L}{\partial f_t} y_t;$ $\frac{\partial L}{\partial y_t} = \frac{\partial L}{\partial z_t} x_t + \frac{\partial L}{\partial f_t} z_t;$ $\frac{\partial L}{\partial x_t} = \frac{\partial L}{\partial y_t} f_{t-1} + \frac{\partial L}{\partial z_t} y_t;$ wherein $w_1$, $w_2$ represent weights of the RNN, at represents an input, $f_1$ represents an output, $x_t$, $y_t$, $z_t$ are the intermediate data, t is at a time t, and L is a cost function.

2. The data processing method according to claim 1, further comprising:
    storing the result of the reverse calculation in a global memory unit.

3. The data processing method according to claim 1, wherein the global data comprises:
    output data of a previous forward calculation, a weight of the output data of the previous forward calculation, input data of the forward calculation, and a weight of the input data of the forward calculation.

4. The data processing method of claim 1, wherein the buffer unit is a register or a cache.

5. A data processing device, implemented by circuits for implementing functions, comprising:
    one or more processors; and
    a storage device configured to store one or more programs, wherein
    the one or more programs, when executed by the one or more processors, cause the one or more processors to:
    perform a forward calculation of a neural network on global data to obtain output data of the forward calculation;
    store the output data of the forward calculation in a global memory unit, wherein intermediate data is not stored in the global memory unit;
    perform the forward calculation of the neural network on the global data again, to obtain the intermediate data for a reverse calculation of the neural network;
    store the intermediate data in a buffer unit;
    read the intermediate data from the buffer unit, and
    perform the reverse calculation of the neural network on the intermediate data to obtain a result of the reverse calculation,
    wherein the neural network is a recurrent neural network (RNN);
    following formulas are used in the forward calculation in the RNN:

$x_t = a_t w_1 + f_{t-1} w_2;$ $y_t = x_t f_{t-1};$ $z_t = x_t y_t;$ $f_t = y_t z_t;$ following formulas are used in the reverse calculation in the RNN:

$\frac{\partial L}{\partial f_t} = \frac{\partial L}{\partial y_{t+1}} x_{t+1} + \frac{\partial L}{\partial x_{t+1}} w_2;$ $\frac{\partial L}{\partial z_t} = \frac{\partial L}{\partial f_t} y_t;$ $\frac{\partial L}{\partial y_t} = \frac{\partial L}{\partial z_t} x_t + \frac{\partial L}{\partial f_t} z_t;$ $\frac{\partial L}{\partial x_t} = \frac{\partial L}{\partial y_t} f_{t-1} + \frac{\partial L}{\partial z_t} y_t;$ wherein $w_1$, $w_2$ represent weights of the RNN, at represents an input, $f_1$ represents an output, $x_t$, $y_t$, $z_t$ are the intermediate data, t is at a time t, and L is a cost function.

6. The data processing device according to claim 5, wherein the one or more programs, when executed by the one or more processors, cause the one or more processors further to:
   store the result of the reverse calculation in a global memory unit.

7. The data processing device according to claim 5, wherein the global data comprises:
   output data of a previous forward calculation, a weight of the output data of the previous forward calculation, input data of the forward calculation, and a weight of the input data of the forward calculation.

8. The data processing device of claim 5, wherein the buffer unit is a register or a cache.

9. A non-transitory computer-readable storage medium comprising computer executable instructions stored thereon, wherein the executable instructions, when executed by a processor, causes the processor to implement the data processing method of claim 1.

* * * * *